United States Patent [19]
Rowe

[11] 3,911,247
[45] Oct. 7, 1975

[54] THERMOSTAT MOUNTING DEVICE FOR PLASTIC TUB DISHWASHER

[75] Inventor: Richard A. Rowe, Fern Creek, Ky.

[73] Assignee: General Electric Company, Louisville, Ky.

[22] Filed: Oct. 30, 1974

[21] Appl. No.: 519,332

[52] U.S. Cl. .............................. 219/328; 134/57 D
[51] Int. Cl.² ............................................ F24H 1/00
[58] Field of Search ........... 219/328, 523, 441, 442; 134/56 D, 57 D, 105

[56] References Cited
UNITED STATES PATENTS

| | | |
|---|---|---|
| 2,151,354 | 3/1939 | Osuch ........................ 134/57 D X |
| 2,851,578 | 9/1958 | Sidell ................................ 219/441 |
| 3,303,327 | 2/1967 | Himelsbaugh .................. 219/523 X |
| 3,369,105 | 2/1968 | Wheeler .......................... 219/328 X |
| 3,440,399 | 4/1969 | Reifenberg ...................... 219/328 X |
| 3,678,246 | 7/1972 | Blachly ............................ 219/441 X |
| 3,822,029 | 7/1974 | Butsch ............................... 134/200 |

*Primary Examiner*—C. L. Albritton

[57] ABSTRACT

A dishwasher having a unipartite plastic tub, a dish-drying means, and a thermostat mounted exteriorly of the tub, includes a unique thermostat-mounting device to hold the thermostat in positive abutting relationship to the tub bottom wall. The mounting device further prevents condensate from shorting the circuitry connecting the thermostat to the dishwasher controls.

4 Claims, 2 Drawing Figures

THERMOSTAT MOUNTING DEVICE FOR PLASTIC TUB DISHWASHER

BACKGROUND OF THE INVENTION

Thermostats are typically provided in dishwashers to deenergize the heating element when the temperature inside the wash chamber exceeds a preselected value. Typically, such thermostats have projected through an opening in the tub to directly sense the ambient conditions in the wash chamber. It has been suggested, in U.S. Pat. No. 3,397,708, that the thermostat be mounted on the exterior of the dishwasher tub wall to sense the ambient conditions therein.

It has, of course, long been the practice to use thermostats to sense ambient conditions inside a coffeepot, as suggested in U.S. Pat. No. 3,369,105, or the temperature within a photographic solution container, as shown in U.S. Pat. No. 3,147,366.

However, none of the prior art devices suggest an arrangement which overcomes the problem of the tub wall thermally distorting to a position out of contact with the thermostat. Similarly, the problem of preventing condensate or grease under the tub from shorting the thermostat circuitry has not been solved. The present invention is a straightforward, inexpensive, readily-assembled and easily-maintained device for holding a thermostat in abutting relationship to a dishwasher tub bottom and preventing condensate or grease from shorting the thermostat circuitry.

SUMMARY OF THE INVENTION

The present invention is a thermostat mounting device which includes a threaded portion, encapsulating a thermostat, and having a skirt member projecting from one end to shield the electrical terminals which connect the thermostat to the control circuitry. The mounting device is screwed into a threaded aperture in the support means of the dishwasher tub thereby forcing the thermostat into heat-exchange abutting relationship with the bottom wall thereof.

More specifically, the invention includes a dishwasher of the type comprising a tub and a door defining a wash chamber; means for supplying heat to the wash chamber; a thermostat for deenergizing the heating means in response to a predetermined temperature in the wash chamber; and mounting means mounting the thermostat in heat-exchange relationship to the wash chamber, the dishwasher includes the improvement wherein: the tub is supported by exterior support means and includes an imperforate wall section having an interior surface exposed to the wash chamber and an exterior surface; the thermostat includes: a body having a peripherally extending portion, adjacent one end extending outwardly past the periphery of the thermostat body and electrical terminals adjacent the other end; the thermostat-mounting means includes: an exteriorly-threaded receptacle screwed into the tub support means, the receptacle having a cavity therein receiving the thermostat body; a skirt member peripherally attached at one end and extending outwardly therefrom to shield the electrical terminals of the thermostat; and an edge portion engaging the underside of said peripherally extending portion to urge the thermostat into heat transfer relation with the exterior surface of the tub.

The thermostat-mounting device of this invention has been found to be useful in sensing the temperature inside the wash chamber of a plastic-tub dishwasher, thus avoiding damage to the tub.

DESCRIPTION OF THE PREFERRED EMBODIMENT

Figure 1:
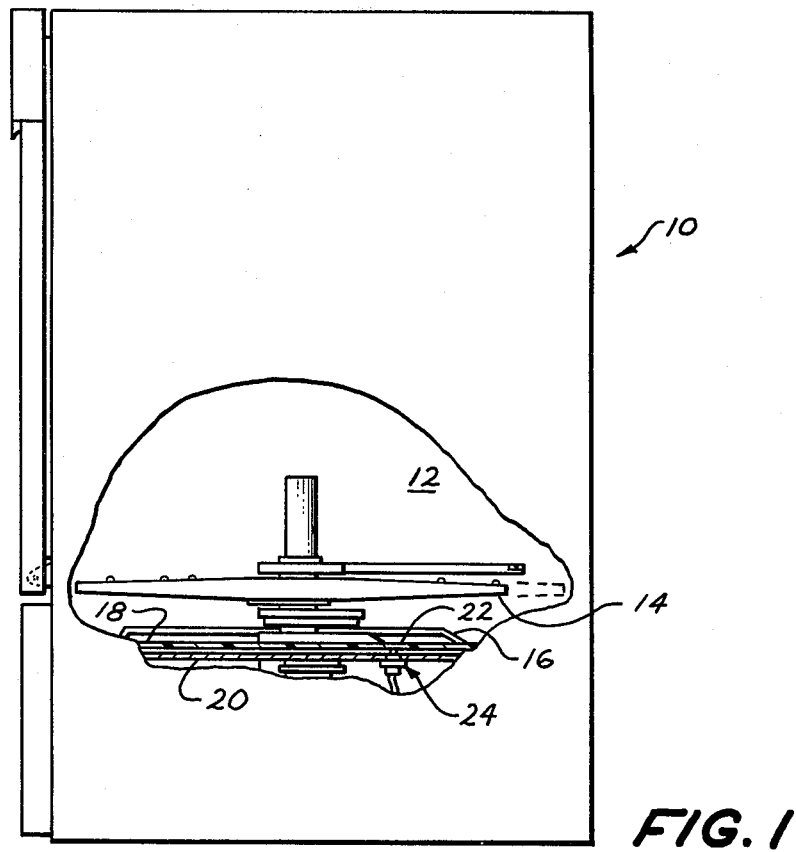
FIG. 1 is a cutaway side view showing the positioning of the thermostat-mounting means in a dishwasher.
Figure 2:
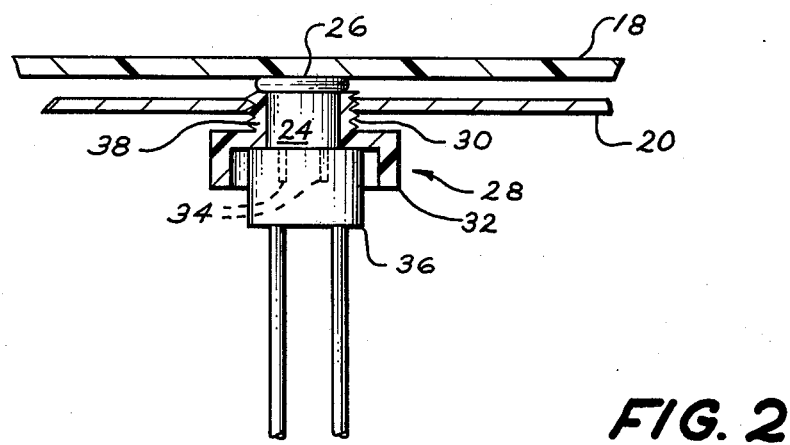
FIG. 2 is a partial, enlarged, cross-sectional view of the mounting means of this invention installed in a dishwasher.

Referring to FIG. 1, there is illustrated a dishwasher 10 comprising a tub and door defining a wash chamber 12. Other major components of the dishwasher 10 include a spray arm 14 and a resistance-type heating element 16. The wash chamber 12 has a bottom wall 18 supported by support means 20. Preferably, the tub defining the wash chamber is unipartite and fabricated from a polymeric resinous material, such as polypropylene. Reference is made to U.S. Pat. Nos. 3,834,784; 3,821,961; 3,826,553; 3,834,783; 3,822,084; and 3,822,029 for a more complete description of dishwashers having unipartite plastic tubs.

The tub bottom 18 includes an imperforate section 22, against which is mounted a thermostat 24.

The thermostat includes an upper cap 26 which is held in abutting relationship against the bottom wall 18 by the mounting device 28. The mounting device 28 includes an exteriorly-threaded receptacle portion 30 and an outwardly extending skirt member 32 peripherally attached thereto. The thermostat 24 includes electrical terminals 34 which are received by plug 36 and are thereby incorporated into the dishwasher control circuitry. Skirt member 32 extends downwardly and forms a drip shield to prevent condensed water and grease from shorting the electrical terminals. Mounting device 28 is screwed into a threaded aperture in support means 20 to position it adjacent the bottom wall 18.

In the installation and operation of the thermostat-mounting device of this invention, a thermostat is inserted into the body portion 38 of the mounting device with its cap 26, in abutting relationship with the upper edge thereof. The mounting device containing the thermostat is then screwed into a threaded aperture in the dishwasher tub support means until cap 26 is in heat-transfer abutting relationship with the tub bottom 18. The mounting device is threaded into the aperture to the extent that cap 26 causes bottom wall 18 to deflect away from its relaxed position, thus reducing the possibility of the tub bottom thermally distorting to a position out of contact with the thermostat. Thus, there will always be good heat transfer between the bottom wall and the cap itself. Plug 36 is then attached to electrical terminals 34 to place the thermostat into the control circuitry of the dishwasher. The dishwasher is now ready for installation, with the thermostat protecting the tub from overheating and the mounting device ensuring that the thermostat will remain in heat-transfer relationship with the tub, and further ensuring that water condensation on the bottom side of the tub bottom will not seep between the threads or around the tub support means and short the electrical terminals.

The mounting device of this invention is typically fabricated from a polymeric resinous material which has a heat-transfer coefficient lower than that of the thermostat cap and the tub support means, thus ensuring that all of the heat transferred to the cap will be further transferred to thermostat proper, rather than dissipated through the body portion to the support means. Such materials having suitably low heat-transfer coefficients include, but are not limited to, polyethylene, polypropylene, polyvinylchloride, polystyrene, acrilonitrile butadiene styrene, and combinations and copolymers thereof.

Having described the invention, what is claimed is:

1. A dishwasher of the type comprising a tub and a door defining a wash chamber; means for supplying heat to the wash chamber; a thermostat for deenergizing the heating means in response to a predetermined temperature in the wash chamber; and mounting means mounting the thermostat in heat-exchange relationship to the wash chamber, the improvement wherein: the tub is supported by exterior support means and includes an imperforate wall section having an interior surface exposed to the wash chamber and an exterior surface;

the thermostat including: a body having a peripherally extending portion adjacent one end, projecting outwardly past the periphery of the thermostat body; and electrical terminals adjacent the other end;

the thermostat-mounting means including: an exteriorly-threaded receptacle screwed into said tub support means, said receptacle having a cavity therein receiving the thermostat body; a skirt member peripherally attached at one end and extending outwardly therefrom to shield the electrical terminals of said thermostat; and a peripheral edge engaging the underside of said peripherally extending portion to urge the thermostat into heat-transfer relation with the exterior surface of the tub.

2. The dishwasher of claim 1 wherein the mounting means places the heat-transfer member in the position deflecting the wall section from its relaxed position.

3. The dishwasher of claim 2 wherein the skirt attached to the receptacle extends downwardly and forms a drip shield to prevent condensed water and grease from shorting the electrical terminals.

4. The dishwasher of claim 3 wherein said receptacle is constructed of a material which has a lower heat-transfer coefficient than the heat-transfer coefficient of the tub support means and the thermostat, thereby preventing transfer of heat from the tub wall to the support means bypassing the thermostat.

* * * * *